United States Patent
Kita

(10) Patent No.: US 8,931,653 B2
(45) Date of Patent: Jan. 13, 2015

(54) ELECTRICAL JUNCTION BOX

(75) Inventor: Yukinori Kita, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 1443 days.

(21) Appl. No.: 12/591,788

(22) Filed: Dec. 1, 2009

(65) Prior Publication Data

US 2010/0133265 A1    Jun. 3, 2010

(30) Foreign Application Priority Data

Dec. 2, 2008   (JP) .................................. 2008-307946

(51) Int. Cl.
*H02G 3/08* (2006.01)
*H01R 13/46* (2006.01)
*H01R 12/00* (2006.01)
*H05K 7/02* (2006.01)

(52) U.S. Cl.
CPC ........................................ *H02G 3/08* (2013.01)
USPC ......... 220/3.9; 174/520; 439/76.1; 248/354.5

(58) Field of Classification Search
CPC .......... B60R 16/0238; B60R 16/0239; H01H 2085/208; H01H 85/2035; H02G 3/088
USPC ........... 174/58; 439/76.1, 76.2; 361/809, 810; 248/354.5, 354.6
See application file for complete search history.

(56) References Cited

U.S. PATENT DOCUMENTS

| | | | | |
|---|---|---|---|---|
| 1,621,536 A | * | 3/1927 | Handte | 414/685 |
| 5,810,303 A | * | 9/1998 | Bourassa et al. | 248/205.1 |
| 6,283,193 B1 | * | 9/2001 | Finch et al. | 160/191 |
| 6,515,228 B2 | * | 2/2003 | Albert et al. | 174/525 |
| 7,275,649 B2 | * | 10/2007 | Ferran Palau | 220/3.2 |
| 2003/0221286 A1 | * | 12/2003 | Pinto | 16/321 |

FOREIGN PATENT DOCUMENTS

| | | | | |
|---|---|---|---|---|
| DE | 4309299 C1 | * | 3/1994 | ...... H02G 3/12 |
| JP | U-7-42538 | | 8/1995 | |
| JP | A-11-113136 | | 4/1999 | |
| JP | A-2001-314013 | | 11/2001 | |
| JP | A-2003-92816 | | 3/2003 | |
| JP | A-2006-217778 | | 8/2006 | |
| JP | A-2007-104814 | | 4/2007 | |
| JP | A-2008-86170 | | 4/2008 | |
| JP | 2010136487 A | * | 6/2010 | |
| WO | WO 0156048 A1 | * | 8/2001 | |

* cited by examiner

*Primary Examiner* — Bryon Gehman
*Assistant Examiner* — Shawn M Braden
(74) *Attorney, Agent, or Firm* — Oliff PLC

(57) ABSTRACT

A bracket secured to a vehicle body is firmly attached to an electrical junction box without causing any loosening. The electrical junction box includes a bracket securing section provided integrally on a casing outer surface and a bracket made of a resin molding material fixed on the bracket securing section by a bolt and a nut. Bolt holes are provided in the bracket securing section and the bracket, respectively. Positioning pins project near the bolt hole in one of the bracket securing section or the bracket. The positioning holes are provided in the other of the bracket securing and the section or bracket to receive the positioning pins. After the positioning pins are fitted in the positioning holes to position and hold the bracket on the bracket securing section, a bolt is inserted into the corresponding bolt holes and is fastened by a nut.

14 Claims, 8 Drawing Sheets

(A)

(B)

ELECTRICAL JUNCTION BOX

INCORPORATION BY REFERENCE

This application claims priority to JP 2008-307946 filed in Japan on Dec. 2, 2008, the disclosure of which is hereby incorporated by reference in its entirety.

BACKGROUND

This invention relates to an electrical junction box and, more particularly, relates to an improvement of a bracket that projects from a casing outer surface of the electrical junction box and fixes the electrical junction box to a securing member of a vehicle body panel or the like.

Heretofore, a bracket that projects from such a kind of electrical junction box is disclosed in, for example, JP 2008-86170 A. In many cases, a metallic bracket is fixed on a securing section provided on the electrical junction box made of a resin molding material by a bolt and a nut.

However, in the case where a bolt is inserted into bolt holes in the securing section made of the resin molding material and in the metallic bracket and is fastened by a nut, it is impossible to set a precise dimension on account of the different materials. Consequently, a movement occurs in the connected portions. This connection, thus, fails to obtain a strong securing function.

The metallic bracket is first fixed on the electrical junction box and the bracket is then fixed on a vehicle body in an assembling line. However, unless the bolt is fasten after the bracket is positioned and fixed on the electrical junction box, the bracket will rotate about the bolt hole. This rotation must then be corrected in the course of attaching the electrical junction box to the vehicle body.

Furthermore, even if the bracket is properly attached to the electrical junction box, since the bracket can readily rotate during attachment to the vehicle body, there is a possibility that the fastening action between the bolt and nut which secures the bracket to the electrical junction box is subject to looseness after attachment.

In view of the above problem, an object of the present invention is to provide an electrical junction box wherein a bracket is fixed at a proper position on the box, the bracket can be prevented from rotating upon attachment to a vehicle body, and bolt fastening portions between the electrical junction box and the bracket do not result in a loose attachment.

SUMMARY

In order to overcome the above problem, an electrical junction box for a motor vehicle includes: a bracket securing section provided integrally on a casing outer surface on the box; and a bracket made of a resin molding material, the bracket being fixed on the bracket securing section by a bolt and a nut. A plurality of bolt holes are provided in the bracket securing section and the bracket. A plurality of positioning pins project near the bolt holes in one of the bracket securing section and the bracket. A plurality of positioning holes are provided in the other of the bracket securing section and the bracket to receive the positioning pins. After the positioning pins are fitted in the positioning holes to position and hold the bracket on the bracket securing section, a bolt is inserted into the bolt holes. The plurality of bolt holes corresponding with each other and being fastened by the nut.

According to the present invention, the bracket that fixes the electrical junction box on the vehicle body is made of a resin molding material that is the same material as that of the electrical junction box. The bracket made of the resin molding material is fixed on the bracket securing section integrally projected from the casing outer surface of the electrical junction box by the bolt and nut. The bracket is positioned and held on the bracket securing section by fitting the positioning pins in the positioning holes. Since the positioning pins and holes are made of the same resin material, it is possible to fit the positioning pins in the positioning holes at a strictly precise dimension. Since the bracket is fixed on the bracket securing section by the bolt after the positioning pins are fitted in the positioning holes, it is possible to prevent the bracket from rotating upon fastening the bolt and to fix the bracket on the electrical junction box at the proper position. Furthermore, since the bracket is unrotatably fixed on the electrical junction box by the positioning pins, even if a rotary load is applied to the bracket when the bracket is fixed on the vehicle body, it is possible to surely prevent the bolt from being turned and the nut from being loosened.

Preferably, the positioning pins project from the bracket. A pair of locking portions are provided on the bracket at opposed positions on both sides of the bolt hole. The positioning holes are provided in the bracket securing section. A portion being locked is provided on the bracket securing section to be engaged with the locking portion. The bolt is fastened by the nut when the bracket is fitted on the bracket securing section.

That is, it is possible to enhance a fixing strength between the bracket and the bracket securing section by fixing the bracket and the bracket securing section by three positioning and fixing means including the bolt and nut fastening action, the fitting action between the positioning pins and holes, and the locking action. Consequently, during the transfer of the electrical junction box before the bracket is fixed on the bracket securing section or during fixing of the electrical junction box on the vehicle body, it is possible to prevent an attaching angle between the bracket and the bracket securing section from being changed and the attached portion between them from rattling.

Preferably, a pair of positioning pins may be provided around the bolt holes of the bracket near positions opposed to the locking portions.

Accordingly, the positioning holes are provided around the bolt hole at the side of the bracket securing section of the electrical junction box near the positions opposed to the portion being locked which engages with the locking portions.

Thus, when the positioning pins are fitted in the four corners near the bolt hole, it is possible to prevent the bracket from rotating.

The four positioning pins and holes may have either the same diameter or different diameters. In the case of the same diameter, the bracket can be readily attached to the bracket securing section. In the case of the different diameters, it is possible to prevent an attachment error.

Preferably, a projecting height of the positioning pins may be greater than that of the locking portions.

Thus, since the positioning pins are inserted into the positioning holes first, the positioning of the bracket can be completed and then the locking connection can be performed, thereby coupling the locking portions to the portions being locked.

Preferably, the bracket may be provided on one side in a longitudinal direction with the bolt holes of the bracket for securing the bracket, the positioning pins, and the locking portions. The bracket is provided on the other side in a longitudinal direction with the bolt holes of the bracket for securing a vehicle body. The bracket may include a main body provided with the bolt holes in opposite ends in a longitudinal direction and a reinforcing side wall extending along an entire longitudinal length of each outer edge in a width direction of the main body.

Since the bracket is made of a resin material (non-metallic material), the bracket is likely not as strong as a metallic bracket. Accordingly, as described above, the reinforcing side wall having an L-shape in cross section is provided along one side edge of the main body, thereby giving the resin bracket the same or higher strength as that of the metallic bracket.

Furthermore, it is preferable that the main body and reinforcing side wall of the bracket may have large thicknesses, the main body may be provided with a plurality of recesses spaced away from one another, and the reinforcing side wall may be provided with a plurality of hollow portions.

That is, although the large thickness may enhance the strength of the bracket, this will also increase the weight of the bracket. The spaced recesses on the main body can decrease the weight of the bracket. In other words, the main body is provided on an entire surface with the continuous reinforcing side wall in which bottom surfaces of the recesses are set to be reference surfaces.

On the other hand, the spaced hollow portions in the reinforcing side wall will decrease the weight of the bracket. If the reinforcing side wall is provided with hollow portions and a smooth outer surface, the bracket will hardly interfere with the peripheral members around the electrical junction box.

An electrical component containing section may project from an outer surface of the bracket.

Electrical components to be attached in the electrical component containing section are, for example, a connector, a joint connector, a cassette relay, a cassette fuse, and the like.

Thus, if the bracket is provided with the electrical component containing section, it is not necessary to provide an additional connector holder or the like. Also, when there is no space to support the cassette relay or the cassette fuse around the electrical junction box, it is possible to attach the cassette relay or the like to the bracket. Preferably, the electrical component containing section is provided on the outer surface of the reinforcing side wall of the bracket.

Since the bracket is prevented from interfering with the peripheral members when the bracket is fixed on the vehicle body, the bracket may be formed into a configuration twisted outward and upward from the attaching position on the bracket securing section.

Since the bracket is made of the resin molding material, it is possible to form the bracket into an unusual shape, thereby preventing an interference with the peripheral members.

Preferably, the nut is fixed on the bracket securing section beforehand. The shape of the nut and a nut fixing method are not limited, so long as the thread tube of the nut can be communicated with the bolt hole in the bracket securing section.

For example, a clamping spring may project from the outer surface of the thread tube in a J-shape, the clamping spring may be attached to a distal end of the bracket securing section, and a bolt hole forming portion of the bracket securing section may be clamped between the thread tube of the nut and the press spring.

Otherwise, the nut may have the thread tube molded or press-fitted on the bracket securing section.

It should be noted that the bracket is not always fixed on a vehicle body panel. The bracket may be fixed on a different on-vehicle member. The words "vehicle body" described in the specification include different members to be mounted on a vehicle body panel and having a bracket securing section.

As described above, the bracket serves to fix the electrical junction box on the vehicle body and is made of the resin molding material. The bracket securing section integrally projects from the casing outer surface of the electrical junction box made of the resin molding material. Since the bracket and the bracket securing section are under a resin material coupling, the positioning pins and holes can be formed in the bracket and the bracket securing section with high precision and can be fitted on each other properly. Thus, since the bracket and the bracket securing section are positioned and held before fastening them with the bolt and nut, the bracket does not rotate upon fastening the bolt. The bracket is thus prevented from rotating on the bracket securing section and rattling after fastening the bolt. Furthermore, since the bracket is prevented from rotating at the fixing side of the electrical junction box, even if a rotary load is applied to the bracket when the bracket is fixed on the vehicle body, the bracket will not rotate and the electrical junction box can be properly fixed on the vehicle body.

DETAILED DESCRIPTION OF THE PREFERRED EMBODIMENTS

Figure 1:
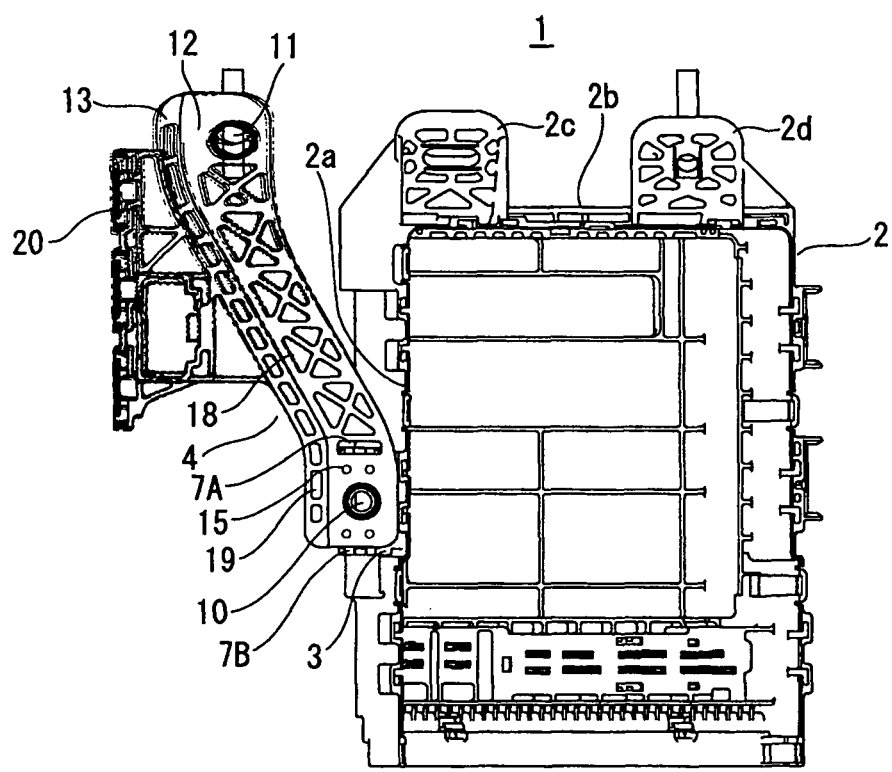
FIG. 1 is a plan view of an electrical junction box that includes an embodiment of a bracket.

Referring now to the drawings, an embodiment of an electrical junction box for a motor vehicle in accordance with the present invention will be described below.

Figure 2:
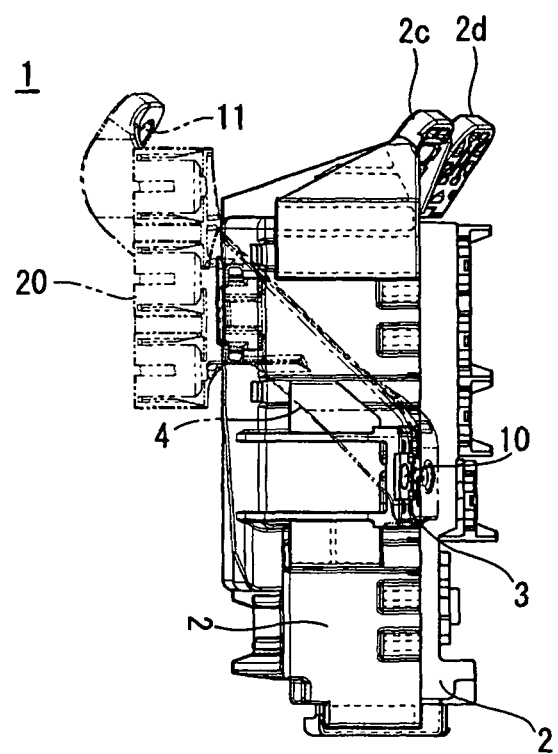
FIG. 2 is a front elevation view of the electrical junction box shown in FIG. 1.
Figure 3:
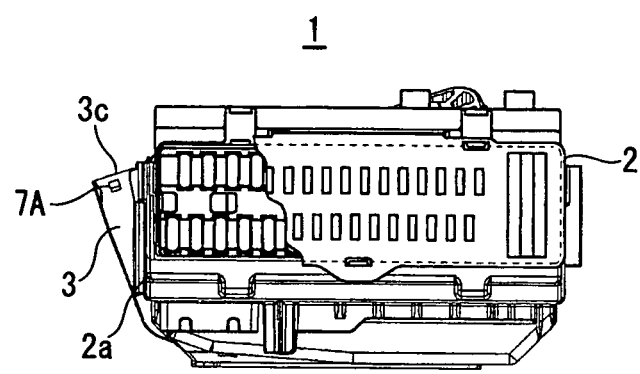
FIG. 3 is a side elevation view of the electrical junction box provided with a bracket securing section.
Figure 4:
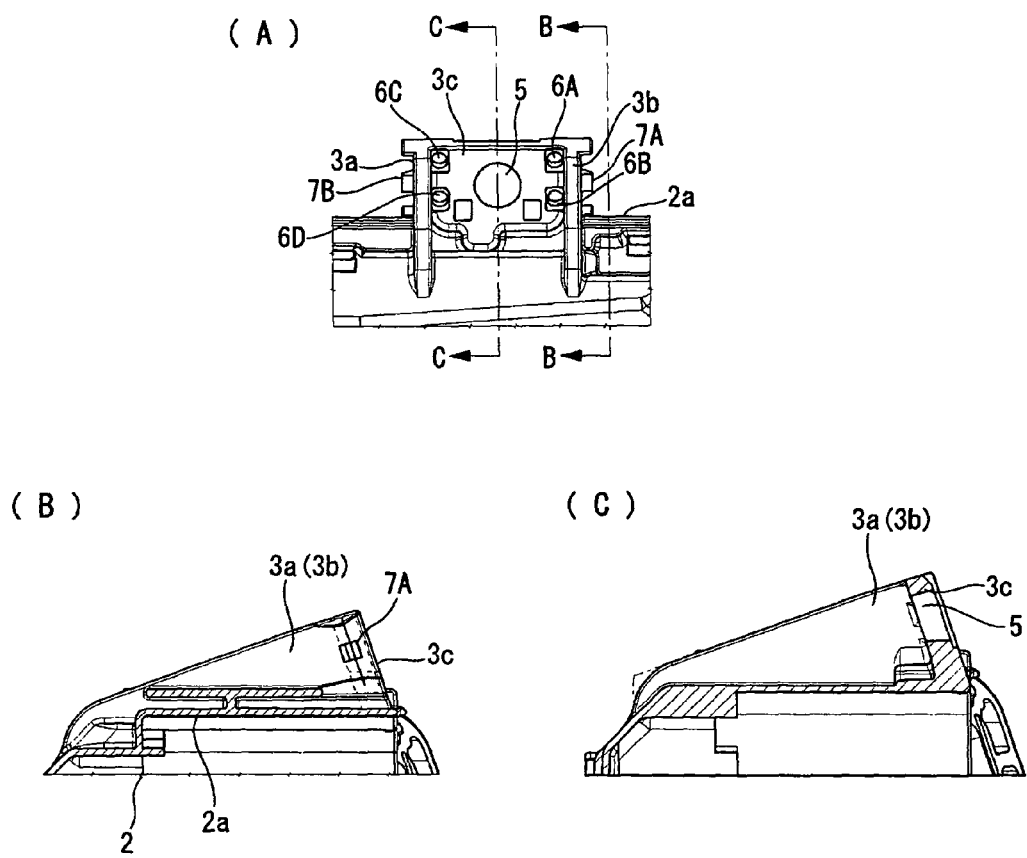
FIG. 4A is an enlarged plan view of the bracket securing section shown in FIG. 3.
FIG. 4B is a cross section view of the bracket securing section taken along lines B-B in FIG. 4A.
FIG. 4C is a cross section view of the bracket securing section taken along lines C-C in FIG. 4A.

An electrical junction box 1 shown in FIGS. 1 to 3 includes a casing 2 and a bracket securing section 3 on an outer side surface of the casing 2. The casing 2 and bracket securing section 3 are integrally made of a resin molding material. A longitudinal end of a bracket 4 made of a resin molding material is fixed on the bracket securing section 3 by means of a bolt and a nut. The bracket 4 is secured to a vehicle body (not shown) on an assembling line of a motor vehicle by a bolt and a nut.

The electrical junction box 1 contains internal circuit members (not shown) in the casing 2 which include a containing section for fuses, relays, and connectors, and constitutes a junction box provided with branched circuits in a high density. The bracket securing section 3, supporting the bracket 4, projects from a part of an outer surface 2a of the casing 2.

Brackets 2c and 2d project integrally from an outer surface 2b on another side of the casing 2. The brackets 2c and 2d are directly secured to a vehicle body by bolts and nuts.

As shown in FIG. 3 and FIGS. 4A to 4C, the bracket securing section 3 includes right and left side frames 3b and 3a that project and incline outward from a lower part of the casing outer surface 2a, and an upper frame 3c that couples the right and left side frames 3b and 3a to the casing outer surface 2a to define a triangular shape.

The upper frame 3c which inclines slightly downward is provided in a central part with a bolt hole 5 and in the right and left sides and in the front and rear sides with four positioning holes 6 (6A to 6D) with respect to the bolt hole 5. The right and left side frames 3b and 3a are provided with a locking pawl 7A at a position opposed to the positioning holes 6A and 6B and with a locking pawl 7B at a position opposed to the positioning holes 6C and 6D.

Figure 5:
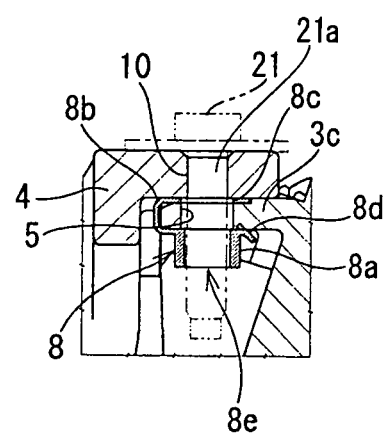
FIG. 5 is an enlarged section view of the bracket securing section, illustrating a bolt and a nut attached to the bracket securing section so as to fix the bracket on the bracket securing section.

As shown in FIG. 5, a nut 8 is attached to the upper frame 3c from the outside to secure the bracket 4 to the upper frame 3c of the bracket securing section 3. The nut 8 is provided with a press spring 8b forming a J-shape from an outer surface of a thread tube 8a with an internal thread. The upper frame 3c is clamped between the press spring 8b and the thread tube 8a of the nut 8 so that a bolt hole 8c in the press spring 8b and a thread hole 8e in the thread tube 8a are communicated with the bolt hole 5 in the upper frame 3c to receive a bolt 21. Furthermore, the thread tube 8a is provided with a latch piece 8d projecting from the thread tube 8a at a side opposite from the press spring 8b so that the latch piece 8d engages with a corner of the upper frame 3c of the bracket securing section 3 and a corner of the casing outer surface 2a.

Figure 6:
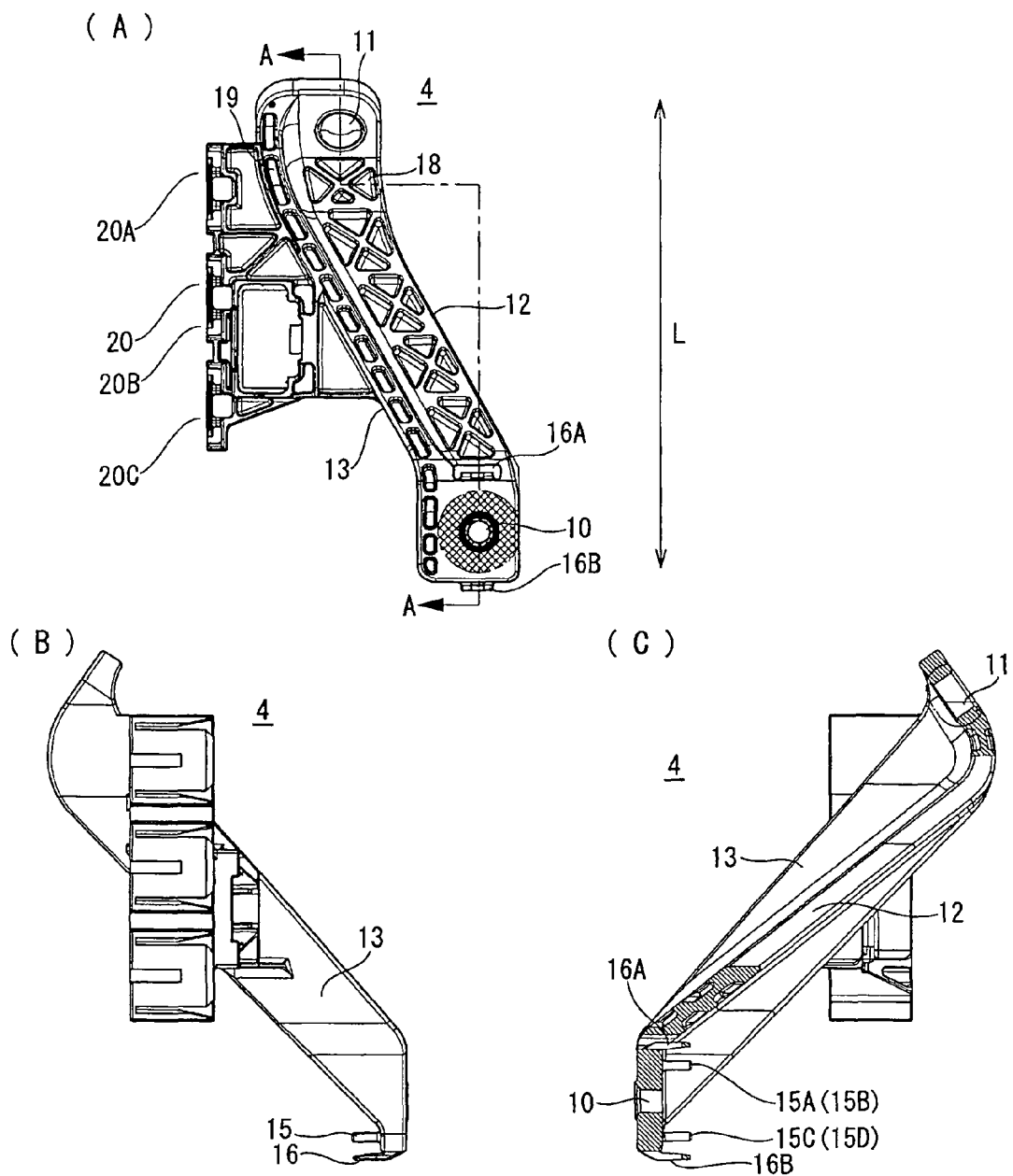
FIG. 6A is a plan view of the bracket.
FIG. 6B is a side elevation view of the bracket shown in FIG. 6A.
FIG. 6C is a longitudinal section view of the bracket taken along lines A-A in FIG. 6A.

The bracket 4 made of the resin molding material is configured as shown in FIGS. 6A to 6C.

In order to prevent the bracket 4 from interfering with peripheral members around an attaching position, the bracket 4 is twisted in a longitudinal direction L in an unusual shape. As shown in FIGS. 1, 2, and 6A to 6C, the bracket 4 is bent from a lower end to an upper end in a direction spaced away from the electrical junction box 1 and is straightened upward at the upper end. Thus, the bracket 4 is twisted along the longitudinal direction.

The bracket 4 has an L-shape in cross section in a direction perpendicular to the longitudinal direction L. The bracket 4 includes a main body 12 that is provided in the lower end in the longitudinal direction L with a bolt hole 10 for receiving the electrical junction box 1 and is provided in the upper end in the direction L with a bolt hole 11 for attaching the bracket 4 to the vehicle body. The main body 12 also includes reinforcing side wall 13 that projects from the whole length of one side edge (a side edge opposite from the electrical junction box 1) in a width direction of the main body 12.

Figure 7:
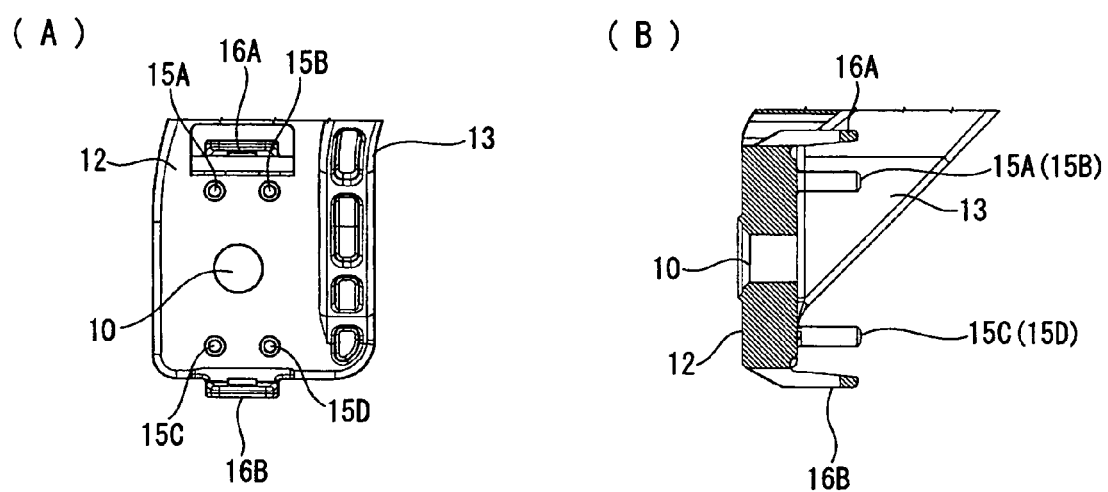
FIG. 7A is a rear side view of the bracket securing section.
FIG. 7B is a section view of the bracket securing section shown in FIG. 7A.

As shown in FIGS. 7A and 7B, right and left positioning pins 15 (four pins 15A to 15D) project from the main body 12 at the opposite sides of the bolt hole 10 for securing the electrical junction box 1. These four positioning pins 15 (15A to 15D) are disposed on the positions corresponding to the positioning holes 6 (6A to 6D) in the bracket securing section 3 so that the positioning pins 15 (15A to 15D) can be inserted into the positioning holes 6 (6A to 6D), respectively.

A locking frame 16A is provided on the main body 12 near the positioning pins 15A and 15B so that the positioning pins 15A and 15B are disposed between the locking frame 16A and the bolt hole 10. The locking frame 16A is adapted to be locked on the locking pawl 7A on the bracket securing section 3.

Similarly, a locking frame 16B is provided on the main body 12 near the positioning pins 15C and 15D so that the positioning pins 15C and 15D are disposed between the locking frame 16B and the bolt hole 10. The locking frame 16B is adapted to be locked on the locking pawl 7B on the bracket securing section 3.

The bolt holes 10, 11, positioning pins 15A to 15D, and locking frames 16A, 16B are provided on the main body 12 and reinforcing side wall 13. The main body 12 and reinforcing side wall 13 have large thicknesses to enhance their strength.

As shown in FIGS. 6A to 6C, the main body 12 is provided with many triangular recesses 18 to decrease the weight. The reinforcing side wall 13 is provided with many through-holes 19 to decrease the weight.

The reinforcing side wall 13 is provided on an outer side with an electrical component containing section 20 on which three connector containing portions 20A-C are juxtaposed.

A process for securing the bracket 4 to the bracket securing section 3 projecting from the casing outer surface 2a of the electrical junction box 1 is carried out by the following steps.

First, the nut 8 is fixed beforehand on the bracket securing section 3 of the electrical junction box 1. Under this condition, the bolt hole 8c in the press spring 8b and thread tube 8a are communicated with and fixed on the bolt hole 5 in the bracket securing section 3.

The bracket 4 at the side of the electrical junction box 1 is disposed so that the bolt hole 10 coincides with the bolt holes 8c and 5.

Figure 8:
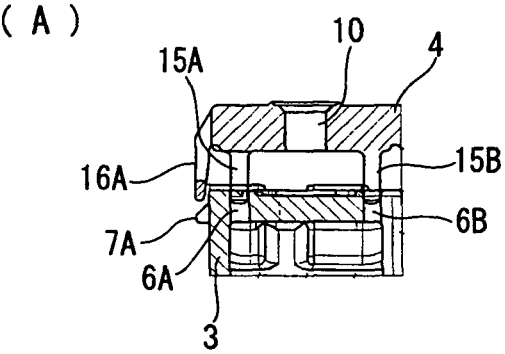
FIG. 8A is a front section view of the bracket and the bracket securing section, illustrating positioning pins of the bracket being inserted into positioning holes in the bracket securing section.
FIG. 8B is a side section view of the bracket and bracket securing section shown in FIG. 8A.
Figure 8:
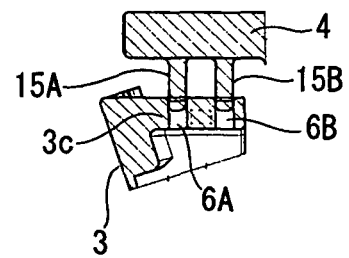

Secondly, the positioning pins 15 (15A to 15D) on the bracket 4 are inserted into the positioning holes 6 (6A to 6D) in the bracket securing section 3, respectively. When the positioning pins 15 (15A to 15D) are inserted to a given depth in the positioning holes 6 (6A to 6D), as shown in FIGS. 8A and 8B, the locking pawl 7A of the bracket securing section 3 is engaged with the locking frame 16A of the bracket 4 and the locking pawl 7B of the bracket securing section 3 is engaged with the locking frame 16B. Thus, the bracket 4 is locked on the bracket securing section 3.

Thus, the positioning pins 15 are fitted in the positioning holes 6 (6A to 6D) and the locking pawls 7A and 7B are engaged with the locking frame 16A and 16B. Under this arrangement, the bolt hole 10 in the bracket 4, the bolt hole 5 in the bracket securing section 3, and the thread tube 8a are communicated with one another and positioned coaxially.

Under this arrangement, a shaft portion 21a of the bolt 21 is inserted into the bolt holes 10, 5, 8c and is screwed into the thread tube 8a of the nut 8. Thus, the bracket 4 is fixed on the bracket securing section 3.

When the bolt 21 is screwed into the nut 8, it is possible to prevent the bracket 4 from turning on the bracket securing section 3 by means of fitting and locking actions between the positioning pins 15 (15A to 15D) and the positioning holes 6 (6A to 6D).

That is, the resin positioning pins 15 (15A to 15B) are fitted in the resin positioning holes 6 (6A to 6B) at the four corners around the bolt holes 10, 5, 8c. The locking pawl 7A of the bracket securing section 3 is engaged with the locking frame 16A of the bracket 4 while the locking pawl 7B of the bracket securing section 3 is engaged with the locking frame 16B of the bracket 4. The bracket 4 is fixed on the bracket securing section 3. Accordingly, it is possible to prevent the bracket 4 from turning even if a rotary load of the bolt 21 is applied to the bracket 4.

Furthermore, the positioning pins 15 (15A to 15D) are fitted and locked in the positioning holes 6 (6A to 6D). The bracket 4 is thus positioned and held on the bracket securing section 3. Since the bolt 21 is fastened in the nut 8 under the above condition, it is not necessary to fasten the nut 8 while the bolt 21 is being positioned in the bolt hole 10 in the bracket 4 and in the bolt hole 5 in the bracket securing section 3. Thus, it is possible to readily and properly carry out the fastening of the bolt.

Also, since the resin positioning pins 15 (15A to 15D) and holes 6 (6A to 6D) are fitted and locked to one another even after fastening and fixing the bracket 4 on the bracket securing section 3 to each other by the bolt 21, it is possible to prevent the fastened portion from being loosened and rattled after fastening the bolt 21.

In addition, when a bolt is inserted into the bolt hole 11 in the other end of the bracket 4 to fix the bracket 4 on the vehicle body in an assembling line of motor vehicles, since the bracket 4 is fixed through the bolt 21 on the bracket securing section 3 without causing any rotation even if a rotary load of the bolt is applied to the bracket 4, the bracket 4 does not rotate and the electrical junction box 1 can be attached to the vehicle body at a precise position with respect to the vehicle body.

As described above, according to an embodiment, since the bracket 4 is made of a resin molding material, the bracket 4 is fixed on the bracket securing section 3 of the electrical junction box 1 without causing any errors due to loosening and rattling in the fastening portions between the bracket 4 and the bracket securing section 3.

Further, since the bracket 4 is made of a resin material, it is possible to produce a bracket 4 that has a complex configuration twisted in the longitudinal direction, thereby disposing the bracket 4 at the position where the bracket 4 does not interfere with the peripheral members.

Furthermore, the reinforcing side wall 13 for enhancing the strength of the bracket 4 is integrally provided on its outer surface with the electrical component containing section 20 which includes a plurality of connector containing portions.

The electrical component containing section 20 may be a cassette attachment section provided on the reinforcing side wall 13 so that the cassette attachment section can receive a fuse cassette, a relay cassette, and the like. If the electrical components are attached to the bracket 4, as described above, it is possible to effectively utilize the bracket 4 when there is no space for attaching a connector holder, a cassette relay, or the like to a periphery around the electrical junction box 1. Thus, it is also possible to simplify the structure of the electrical junction box 1.

It should be noted that the present invention is not limited to the above embodiment. For example, the positioning pins may be provided on the bracket securing section of the electrical junction box and the positioning holes may be provided in the bracket so as to receive the positioning pins. The locking pawl may be provided on the bracket and the locking frame may be provided on the bracket securing section to engage the locking pawl with the locking frame.

Furthermore, in the case where the nut is fixed on the bracket securing section beforehand, the nut may be molded or press-fitted on the bracket securing section. In addition, the nut is separated from the bracket securing section, or the nut is disposed in and communicated with the bolt hole in the bracket securing section to fasten the bolt.

What is claimed is:

1. An electrical junction box for a motor vehicle including:
   a bracket securing section provided integrally on a casing outer surface on the box, a first bolt hole being provided in the bracket securing section;
   a bracket made of a resin molding material and being fixed on the bracket securing section by a bolt and a nut, a second bolt hole being provided in the bracket, and a pair of locking portions being provided on the bracket at opposed positions on both sides of the second bolt hole;
   one or more positioning pins projecting from the bracket near the second bolt hole; and
   one or more positioning holes being provided in the bracket securing section, each positioning hole receiving a respective one of the positioning pins, wherein:
   portions being locked are provided on the bracket securing section to be respectively engaged with the locking portions; and
   in a state in which the bracket is fitted to the bracket securing section, the one or more positioning pins are fitted in the one or more positioning holes to position and hold the bracket securing section, and the bolt passes through the first and second bolt holes and is fastened by the nut.

2. An electrical junction box for a motor vehicle according to claim 1, wherein a pair of the positioning pins are provided around the second bolt hole of the bracket near positions opposed to the locking portions, respectively.

3. An electrical junction box for a motor vehicle according to claim 2, wherein:
   the bracket further includes a main body provided with a reinforcing side wall extending along an entire longitudinal length of an outer edge in a width direction of the main body,
   the second bolt hole is provided at one end of the main body, and
   a third bolt hole is provided at another end of the main body for securing to a vehicle body.

4. An electrical junction box for a motor vehicle according to claim 3, further including an electrical component containing section that projects from an outer surface of the bracket.

5. An electrical junction box for a motor vehicle according to claim 2, further including an electrical component containing section that projects from an outer surface of the bracket.

6. An electrical junction box for a motor vehicle according to claim 1, wherein:
   the bracket further includes a main body provided with a reinforcing side wall extending along an entire longitudinal length of an outer edge in a width direction of the main body,
   the second bolt hole is provided at one end of the main body, and
   a third bolt hole is provided at another end of the main body for securing to a vehicle body.

7. An electrical junction box for a motor vehicle according to claim 6, further including an electrical component containing section that projects from an outer surface of the bracket.

8. An electrical junction box for a motor vehicle according to claim 6, wherein the reinforcing side wall has an L shape cross section.

9. An electrical junction box for a motor vehicle according to claim 6, wherein the main body has a plurality of spaced recesses, and the reinforcing side wall has a plurality of hollow portions.

10. An electrical junction box for a motor vehicle according to claim 6, further including an electrical component containing section provided on an outer surface of the reinforcing side wall.

11. An electrical junction box for a motor vehicle according to claim 1, further including an electrical component containing section projects from an outer surface of the bracket.

12. An electrical junction box for a motor vehicle according to claim 1, wherein a projecting height of the one or more positioning pins is greater than that of the locking portions.

13. An electrical junction box for a motor vehicle including:
- a bracket securing section supporting the bracket, the bracket securing section including right and left side frames projecting and inclining outward from a lower part of a casing outer surface of the box, the bracket securing section further including an upper frame coupling the right and left side frames to the casing outer surface, a first bolt hole being provided in the bracket securing section;
- a bracket, a second bolt hole being provided in the bracket, and a pair of locking portions being provided on the bracket at opposed positions on both sides of the second bolt hole;
- one or more positioning pins projecting from the bracket near the second bolt hole; and
- one or more positioning holes being provided in the bracket securing section, each positioning hole receiving a respective one of the positioning pins, wherein:
- portions being locked are provided on the bracket securing section to be respectively engaged with the locking portions; and
- in a state in which the bracket is fitted to the bracket securing section, the one or more positioning pins are fitted in the one or more positioning holes to position and hold the bracket securing section, and the bolt passes through the first and second bolt holes and is fastened by the nut.

14. An electrical junction box for a motor vehicle according to claim 13, wherein the bracket is made of a resin molding material.

* * * * *